United States Patent
Danielmeier et al.

(10) Patent No.: US 6,420,508 B1
(45) Date of Patent: Jul. 16, 2002

(54) LIGHT-FAST POLYISOCYANATES HAVING GOOD SOLUBILITY IN NON-POLAR SOLVENTS

(75) Inventors: Karsten Danielmeier, Bethel Park, PA (US); Lutz Schmalstieg, Köln (DE); Hans-Josef Laas, Köln (DE); Harald Mertes, Köln (DE); Reinhard Jahn, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/590,340

(22) Filed: Jun. 8, 2000

(30) Foreign Application Priority Data

Jun. 16, 1999 (DE) .......................... 199 27 411

(51) Int. Cl.$^7$ .................. C08G 18/78; C08G 18/79; C08G 18/73; C08G 18/75; C07C 275/60

(52) U.S. Cl. ............ 528/49; 252/182.2; 252/182.21; 252/182.22; 528/55; 528/59; 528/60; 528/65; 528/66; 528/67; 528/73; 528/85; 544/67; 544/68; 544/193; 544/222; 560/115; 560/157; 560/158; 560/330; 560/336; 560/355; 560/357; 560/166; 564/44; 564/45

(58) Field of Search ......... 252/182.2, 182.21, 252/182.22; 528/49, 55, 59, 60, 65, 66, 67, 73, 85; 564/44, 45; 544/193, 222, 67, 68; 560/115, 157, 158, 330, 336, 355, 357, 166

(56) References Cited

U.S. PATENT DOCUMENTS

| | | | |
|---|---|---|---|
| 3,304,286 A | 2/1967 | Altscher et al. | 528/59 |
| 4,160,080 A | 7/1979 | Köenig et al. | 528/59 |
| 4,469,867 A | 9/1984 | Disteldorf et al. | 544/222 |
| 4,737,566 A | 4/1988 | Pedain et al. | 528/76 |
| 4,789,705 A | 12/1988 | Kase et al. | 524/590 |
| 4,810,820 A | 3/1989 | Slack et al. | 560/27 |
| 5,055,514 A | 10/1991 | Kumada et al. | 524/484 |
| 5,086,175 A | 2/1992 | Minato et al. | 544/221 |
| 5,124,427 A | 6/1992 | Potter et al. | 528/67 |
| 5,208,334 A | 5/1993 | Potter et al. | 544/193 |
| 5,235,018 A | 8/1993 | Potter et al. | 528/49 |
| 5,258,482 A | 11/1993 | Jacobs et al. | 528/49 |
| 5,290,902 A | 3/1994 | Jacobs et al. | 528/49 |
| 5,380,792 A | 1/1995 | Renk | 524/840 |
| 5,837,796 A | 11/1998 | Scholl et al. | 528/73 |

FOREIGN PATENT DOCUMENTS

| | | |
|---|---|---|
| CA | 2148783 | 11/1995 |
| EP | 566037 | 10/1993 |
| JP | 61072013 | 4/1986 |
| JP | 2302479 | 12/1990 |
| JP | 3244623 | 10/1991 |
| JP | 4036218 | 2/1992 |
| JP | 4130124 | 5/1992 |
| JP | 4130171 | 5/1992 |
| JP | 4132782 | 5/1992 |
| JP | 4230651 | 8/1992 |
| JP | 7268059 | 10/1995 |
| JP | 9012660 | 1/1997 |

OTHER PUBLICATIONS

Laas H J Et Al: "Zur Synthese Aliphatischer Polyisocyanate–Lackpolyisocyanate Mit Biuret–, Isocyanurat–Oder Uretdionstruktur The Synthesis of Aliphatic Polyisocyanates Containing Biuret, Isocyanurate or Uretdione Backbones for use in Coatings" Journal Fur Praktische Chemie, Chemiker Zeitung, Wiley Vch, Weinheim, de, Bd. 336, Nr. 3, 1994, Seiten 185–200, SP000441642 Issn: 1436–9666 * Seite 196, Absatz 1*.

*Primary Examiner*—Rabon Sergent
(74) *Attorney, Agent, or Firm*—Joseph C. Gil; Thomas W. Roy

(57) ABSTRACT

The present invention relates to polyisocyanate mixtures prepared from aliphatic and/or cycloaliphatic diisocyanates and having a) an average isocyanate functionality of at least 2.0,
b) a content of isocyanate groups (calculated as NCO; molecular weight=42) of 4.0 to 28.0 wt. % and
c) a content of alkoxy groups having up to 36 carbon atoms of 2.0 to 37.5 wt. %, wherein the alkoxy groups are constituents of allophanate groups or optionally urethane groups, provided that >50 mol % of the alkoxy groups are a constituent of allophanate groups that are connected to at least two polyisocyanate molecules which are each prepared from at least two diisocyanates. The present invention also relates to a process for preparing these polyisocyanate mixtures and to coating compositions, which are highly diluted or dilutable with non-polar solvents and contain these polyisocyanate mixtures and lacquer binders or binder components optionally containing isocyanate-reactive groups.

20 Claims, No Drawings

LIGHT-FAST POLYISOCYANATES HAVING GOOD SOLUBILITY IN NON-POLAR SOLVENTS

BACKGROUND OF THE INVENTION

1. Field of the Invention

The present invention relates to polyisocyanate mixtures that are soluble in non-polar solvents, to a process for their production and to their use as starting components for the production of polyurethane plastics, which are highly dilutable with non-polar solvents, in particular, as crosslinking agents for lacquer binders and/or binder components having isocyanate-reactive groups.

2. Description of the Prior Art

Polyisocyanates having aliphatically or cycloaliphatically bound isocyanate groups may be used as high-grade, non-yellowing two-component (2K) polyurethane (PU) coating compositions in many areas of application, for example in automotive coatings or in the construction sector. Due to their relatively high viscosity, these (so-called light-fast) lacquer polyisocyanates are generally used in a form diluted in solvents.

Since it is desired to reduce emissions of toxicologically or environmentally questionable solvents from lacquers and coatings, repeated attempts have been made in recent years to replace these solvents with alternative products, for example with non-polar, environmentally compatible solvents, such as mineral spirits or turpentine. It has not previously been possible to dilute 2K PU coating compositions with these non-polar solvents because they are not sufficiently compatible with the known aliphatic or cycloaliphatic polyisocyanate crosslinking agents.

The aliphatic or cycloaliphatic polyisocyanates, which contain biuret, isocyanurate and/or uretidione groups, are prepared from commercially available diisocyanates, such as hexamethylene diisocyanate (HDI) and/or 4,4'-diisocyanatodicyclohexylmethane, and are particularly important for the production of light-fast polyurethane coatings, are all only sparingly soluble non-polar organic solvents.

In contrast, allophanate-modified polyisocyanurates are much more readily soluble in non-polar solvents. These polyisocyanates may be obtained according to EP-A 238,013, EP-A 496,208, EP-A 524,500, EP-A 524,501, EP-A 566,037, U.S. Pat. No. 4,789,705, U.S. Pat. No. 5,086,175, U.S. Pat. No. 5,258,482, U.S. Pat. No. 5,290,902, U.S. Pat. No. 5,380,792, JP 0 403 621 8 A, JP 0 413 012 4 A, JP 0,413 017 1 A, JP 6 107 201 3 A or JP 901 266 0 A by reacting aliphatic and/or cycloaliphatic diisocyanates with linear or branched aliphatic or cycloaliphatic monoalcohols or diols in the presence of trimerization catalysts. However, when producing such allophanate trimers from monomeric diisocyanates, the reaction becomes exothermic after an unpredictable latency period. When using batch methods, it is thus necessary to dissipate the resultant heat of reaction, which is not always simple to achieve. Moreover, the allophanate-modified polyisocyanurates described in the stated publications, in particular those based on monoalcohols, give rise to coatings having considerably poorer resistance to solvents and chemicals than corresponding unmodified polyisocyanurates.

Pure allophanate polyisocyanates or so-called heteroallophanates, which are described, for example, in EP-A 807,623, also have good solubility in non-polar solvents. However, these products also result in coatings having only moderate resistance characteristics and, thus, are not well suited as crosslinking components for high-grade coating compositions. This also applies to urethanes that are prepared from di- or polyisocyanates and long-chain monoalcohols or dimer diol, even though according to the teachings of U.S. Pat. No. 5,086,175, JP 0 413 278 2 A, JP 0 423 065 1 A and JP 0 726 805 9 A, they exhibit good compatibility with hydrocarbons.

Trimers of special diisocyanates having lipophilic residues, for example cycloaliphatic diisocyanates having a long-chain aliphatic residue attached to the cycloaliphatic ring (EP-A 818,485), branched linear aliphatic diisocyanates (DE-A 3,151,855) or saturated aliphatic or cycloaliphatic diisocyanates having 11–20 carbon atoms (JP 0 324 462 3 A) have also been suggested as polyisocyanate crosslinking agents dilutable with non-polar solvents. However, these special diisocyanates are not available on a large industrial scale and are thus costly.

DE-A 3,613,064, U.S. Pat. No. 3,304,286 and JP 0 230 247 9 A describe isocyanate-functional prepolymers, which are prepared from polyisocyanates and polyols and are readily soluble in non-polar solvents. These products frequently have only a low content of free isocyanate groups and a low functionality. They are consequently less suitable as a crosslinking component for 2K PU systems, but are instead preferably used as the sole binder in moisture-curing one-component systems.

No light-fast polyisocyanates are known, which exhibit good solubility in non-polar solvents and meet all property requirements, i.e. in particular result in highly crosslinked coatings resistant to solvents and chemicals, and which may be obtained in a simple, low-cost process.

An object of the present invention is to provide novel polyisocyanate mixtures having aliphatically and/or cycloaliphatically-bound isocyanate groups and do not suffer from the disadvantages of the prior art.

This object may be achieved with the polyisocyanate mixtures according to the invention, which are described in greater detail below along with a process for their production. The polyisocyanate mixtures according to the invention are based on the surprising observation that, by reacting aliphatic and/or cycloaliphatic polyisocyanates having a low monomer content with alcohols under allophanatization conditions, it is possible to produce highly functional polyisocyanate mixtures which are readily soluble in non-polar solvents even at low temperatures and which, in combination with hydroxy-functional lacquer binders, result in coatings distinguished by outstanding resistance characteristics.

Although some publications relating to the production of polyisocyanates containing allophanate groups, for example EP-A 000,194, EP-A 303,150 and EP-A 682,012, do make general mention of polyisocyanates having a functionality of >2, such as trimerization products of HDI or IPDI, within long lists of suitable starting polyisocyanates, it is not taught or suggested in any of the above-stated publications that reaction products of polyisocyanates having low monomer contents with alcohols produced under allophanatization conditions exhibit particularly good solubility characteristics in non-polar solvents.

SUMMARY OF THE INVENTION

The present invention relates to polyisocyanate mixtures prepared from aliphatic and/or cycloaliphatic diisocyanates and having
 a) an average isocyanate functionality of at least 2.0,
 b) a content of isocyanate groups (calculated as NCO; molecular weight=42) of 4.0 to 28.0 wt. % and c) a content of alkoxy groups having up to 36 carbon atoms of 2.0 to 37.5 wt. %, wherein the alkoxy groups are constituents of allophanate groups or optionally urethane groups, provided that >50 mol % of the alkoxy groups are a constituent of allophanate groups that are connected to at least two polyisocyanate molecules which are each prepared from at least two diisocyanates.

The present invention also relates to a process for preparing these polyisocyanate mixtures by reacting A) a polyisocyanate component having an average NCO functionality of 2.0 to 5.0, a content of aliphatically and/or cycloaliphatically bound isocyanate groups (calculated as NCO; molecular weight=42) of 8.0 to 27.0 wt. % and a content of monomeric diisocyanates of less than 1 wt. % with B) (cyclo)aliphatic alcohols having up to 36 carbon atoms, at an NCO/OH equivalent ratio of 1.9:1 to 80:1 such that >50% of the urethane groups formed by the NCO/OH reaction are converted to allophanate groups.

The present invention further relates to coating compositions, which are highly diluted or dilutable with non-polar solvents and contain these polyisocyanate mixtures and lacquer binders or binder components optionally containing isocyanate-reactive groups.

DETAILED DESCRIPTION OF THE INVENTION

Polyisocyanate component A) has an average NCO functionality of 2.0 to 5.0, preferably of 2.3 to 4.5; a content of isocyanate groups of 8.0 to 27.0 wt. %, preferably of 14.0 to 24.0 wt. %; and a content of monomeric diisocyanates of less than 1.0 wt. %, preferably less than 0.5 wt. % and more preferably 0.0001 to 0.5 wt. %. Component A) contains one or more organic polyisocyanates having aliphatically and/or cycloaliphatically bound isocyanate groups.

Polyisocyanate component A) is selected from any desired polyisocyanates built up from at least two diisocyanate molecules and prepared by modifying monomeric, aliphatic and/or cycloaliphatic diisocyanates to incorporate uretidione, isocyanurate, allophanate, biuret, iminooxadiazinedione and/or oxadiazinetrione groups. Their preparation is described, for example, in *J. Prakt. Chem.* 336 (1994) 185–200, DE-A 1,670,666, DE-A 1,954,093, DE-A 2,452, 532, DE-A 3,700,209 and DE-A 3,900,053 or EP-A 336,205, EP-A 339,396 and EP-A 798,299.

Suitable diisocyanates for preparing polyisocyanates A) are those having a molecular weight of 140 to 400 and having aliphatically and/or cycloaliphatically bound isocyanate groups. Examples include 1,4-diisocyanatobutane, 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 2,4- or 2,6-diisocyanato-1-methylcyclohexane, 1,3- and 1,4-diisocyanatohexane, 1,3- and 1,4-bis(isocyanatomethyl)-cyclohexane, 1-isocyanato-3,3,5-trimethyl-5-isocyanatomethyl-cyclohexane (isophorone diisocyanate or IPDI), 4,4'-diisocyanatodicyclohexylmethane, 1-isocyanato-1-methyl-4(3)isocyanatomethylcyclohexane, bis(isocyanato-methyl)norbornane and mixtures thereof.

Preferred starting components A) are polyisocyanate mixtures containing isocyanurate and/or iminooxadiazinedione groups and prepared from HDI, IPDI and/or 4,4'-diisocyanatodicyclohexylmethane.

Component B) is selected from saturated or unsaturated, linear or branched alcohols. Examples include monoalcohols containing 1 to 36, preferably 1 to 23 carbon atoms, such as methanol, ethanol, n-propanol, isopropanol, n-butanol, isobutanol, tert.-butanol, n-pentanol, 2-hydroxypentane, 3-hydroxypentane, the isomeric methylbutyl alcohols, the isomeric dimethylpropyl alcohols, n-hexanol, n-heptanol, n-octanol, n-nonanol, 2-ethylhexanol, trimethylhexanol, n-decanol, n-undecanol, n-dodecanol (lauryl alcohol), n-tetradecanol, n-pentadecanol, n-hexadecanol, n-heptadecanol, n-octadecanol (stearyl alcohol), 2,6,8-trimethylnonanol, 2-tert.-butylcyclohexanol, 4-cyclohexyl-1-butanol and the linear or branched primary alcohols sold by Henkel AG under the trade name Lorol.

Also suitable as component B) are dialcohols and/or higher functional alcohols having n to 36, preferably n to 23 carbon atoms (where n=OH functionality of the alcohol), such as 1,2-ethanediol, 1,2- and 1,3-propanediol, 1,2- and 1,4-cyclohexanediol, 1,4-cyclohexanedimethanol, 4,4'-(1-methylethylidene)biscyclohexanol, the isomeric butanediols, pentanediols, hexanediols, heptanediols, octanediols, nonanediols, decanediols and undecanediols; higher molecular weight diols such as 1,12-octadecanediol; and higher functional alcohols such as 1,2,3-propanetriol, 1,1,1-trimethylolethane, 1,2,6-hexanetriol, 1,1,1-trimethylolpropane, 2,2-bis(hydroxymethyl)-1,3-propanediol and 1,3,5-tris(2-hydroxyethyl) isocyanurate.

Other suitable alcohols B), which less preferred for the present invention, are those which contain, in addition to the hydroxyl group, other functional groups which are non-reactive towards isocyanate groups, such as ester groups, ether groups and other heteroatoms, e.g., halogen atoms, silicon or nitrogen.

Preferred components B) are monoalcohols and mixtures of these monoalcohols with dialcohols and/or higher functional alcohols.

The process according to the invention is performed by reacting starting components A) and B) with each other at temperatures of 40 to 180° C., preferably of 50 to 150° C., and at an NCO/OH equivalent ratio of 1.9:1 to 80:1, preferably of 2:1 to 50:1, such that >50 mol %, preferably at least 80 mol % and more preferably at least 90 mol %, of the urethane groups initially formed by the NCO/OH reaction react further to form allophanate groups.

The allophanatization reaction may be accelerated by optionally using suitable catalysts, such as the known allophanatization catalysts. Examples include metal carboxylates, metal chelates and tertiary amines, such as those disclosed in British patent GB 994,890; alkylating agents such as those disclosed in US patent U.S. Pat. No. 3,769,318; and strong acids, such as those disclosed in EP-A 000,194.

Suitable allophanatization catalysts include metal compounds such as zinc compounds (for example zinc(II) stearate, zinc(II) n-octanoate, zinc(II) 2-ethyl-1-hexanoate, zinc(II) naphthenate and zinc(II) acetylacetonate), tin compounds (for example tin(II) n-octanoate, tin(II) 2-ethyl-1-hexanoate, tin(II) laurate, dibutyltin oxide, dibutyltin dichloride, dibutyltin diacetate, dibutyltin dilaurate, dibutyltin dimaleate and dioctyltin diacetate), aluminum tri (ethylacetoacetate), iron(III) chloride, potassium octoate, compounds of bismuth, manganese, cobalt or nickel together with strong acids, such as trifluoroacetic acid, sulfuric acid, hydrogen chloride, hydrogen bromide, phosphoric acid or perchloric acid, and mixtures of these catalysts.

Catalysts, which are suitable although less preferred for the process according to the invention, include compounds which catalyze not only the allophanatization reaction but also the trimerization of isocyanate groups to form isocyanurate structures. Examples of these catalysts are described, for example, in EP-A 649,866, page 4, line 7 to page 5, line 15.

Preferred catalysts for the process according to the invention are zinc(II) compounds and/or bismuth(III) compounds. Especially preferred are zinc(II) n-octanoate, zinc(II) 2-ethyl-1-hexanoate, zinc(II) stearate and/or bismuth(III) 2-ethyl-1-hexanoate.

The catalysts are optionally used in the process according to the invention in a quantity of 0.001 to 5.0 wt. %, preferably of 0.005 to 1.0 wt. %, based on the total weight of the reactants.

The catalysts may be added to the reaction mixture using any desired method. For example, it is possible to incorporate the optional catalyst either into polyisocyanate component A) and/or into alcohol component B) before the actual reaction begins. It is also possible to add the catalyst to the reaction mixture at any desired time during the urethanization reaction or, in the case of a two-stage reaction, after urethanization, i.e. once the NCO content theoretically corresponding to complete conversion of isocyanate and hydroxyl groups to urethane groups has been reached. It is also possible to initially react one or more constituents of polyisocyanate component A) with alcohol B) in a urethanization reaction and then after urethanization to add the catalyst with the remaining constituents to polyisocyanate component A).

The course of the reaction may be monitored, for example, by titrimetric determination of the NCO content. Once the desired NCO content has been reached, i.e., once the molar ratio of allophanate groups to urethane groups in the reaction mixture is >1:1, preferably at least 4:1 and more preferably at least 9:1, the reaction is terminated. When the reaction is controlled purely thermally, this may be achieved, for example, by cooling the reaction mixture to room temperature. When, as preferred, an allophanatization catalyst is used, the reaction may be terminated by adding suitable catalyst poisons, for example, acid chlorides such as benzoyl chloride or isophthaloyl dichloride. However, such termination is not essential in the process according to the invention.

In the process according to the invention, the nature and quantities of the starting components are selected within the stated parameters such that the resultant polyisocyanate mixtures comply with the requirements set forth above in a) to c), wherein a) the average NCO functionality is at least 2.0, preferably 2.3 to 9.9 and more preferably to 2.8 to 5.8; b) the NCO content is 4.0 to 28.0 wt. %, preferably 5.0 to 24.0 wt. % and more preferably to 8.0 to 21.0 wt. %; and c) the content of alkoxy groups is 2.0 to 37.5 wt. %, preferably 3.0 to 29.0 wt. % and more preferably 4.0 to 20.0 wt. %., wherein the alkoxy groups are a constituent of an allophanate group or optionally a urethane group, provided that >50 mol %, preferably at least 80 mol % and more preferably at least 90 mol %, of the alkoxy groups are a constituent of allophanate groups that are connected to at least two polyisocyanate molecules which are each prepared from at least two diisocyanates.

The content of alkoxy groups is determined as follows accordingly to formula [1]:

$$\text{Percentage of alkoxy groups} = \frac{\text{Weight of Alcohols B)} \times 100}{\text{Weight of polyisocyanates A)} + \text{Weight of alcohols B)}} \quad [1]$$

The NCO functionality of the products according to the invention may be calculated from the nature and functionality of the starting components in accordance with formula [2]

$$F = \frac{\sum \text{equiv NCO} - \sum (1+x) \cdot \text{equiv OH}}{\sum \left(\frac{\text{equiv NCO}}{f_{NCO}}\right) + \left(\frac{\text{equiv OH}}{f_{OH}}\right) - \sum (1+x) \cdot \text{equiv OH}} \quad [2]$$

wherein $1 \geq x \geq 0$ and "x" means the proportion of the urethane groups converted into allophanate groups in the process according to the invention. The functionality $f_{NCO}$ of the starting polyisocyanates A) may be calculated from the NCO content and the molecular weight, and the molecular weight may be determined by gel permeation chromatography (GPC) or vapor pressure osmosis. $f_{OH}$ is obtained from the number of OH groups in the alcohols used or, in the case of the mixtures, from the amounts and the number of OH groups in the individual alcohols of the mixture.

The process according to the invention may optionally be performed in a suitable solvent which is inert towards isocyanate groups. Examples include known lacquer solvents such as ethyl acetate, 1-methoxy-2-propyl acetate, 3-methoxy-n-butyl acetate, acetone, 2-butanone, 4-methyl-2-pentanone, cyclohexanone, toluene, xylene, chlorobenzene, mineral spirits, substituted aromatics (for example those commercially available under the names Solvent Naphtha, Solvesso, Shellsol, Isopar, Nappar and Diasol), carbonic acid esters (such as dimethyl carbonate, diethyl carbonate, 1,2-ethylene carbonate and 1,2-propylene carbonate), lactones (such as β-propiolactone, γ-butyrolactone, ε-caprolactone and ε-methylcaprolactone), propylene glycol diacetate, diethylene glycol dimethyl ether, dipropylene glycol dimethyl ether, diethylene glycol ethyl and butyl ether acetate, N-methylpyrrolidone, N-methylcaprolactam, and mixtures thereof.

The products according to the invention are clear, virtually colorless polyisocyanate mixtures which, unlike starting polyisocyanates A), may be diluted with non-polar solvents without becoming turbid. Even when highly diluted, for example at a solids content of 30 wt. %, and even at low temperatures, for example at −50° C. to +5° C., the products are non-settling solutions.

The non-polar solvents include, for example, Swasol 310 (Maruzen Petrochemical Co. Ltd.; aniline point 43.5° C.), Exxon Naphtha No. 6 (Exxon Chemical Japan; aniline point 43° C.), Exxon Naphtha No. 5 (Exxon Chemical Japan, aniline point 55° C.) and others as described, for example, in EP-A 566 037 (c.f p.5, lines 40–46) and U.S. Pat. No. 5,086,175 (c.f. page 4, lines 43–55), or any desired mixtures of these solvents.

Polyisocyanates that have not modified according to the invention, in particular lacquer polyisocyanates A), may optionally be added to the polyisocyanate mixtures according to the invention. The amounts are preferably selected such that the resulting polyisocyanates comply with the conditions stated above in a) to c) and consequently also comprise polyisocyanate mixtures according to the invention. The mixtures generally contain (i) the allophanate-modified polyisocyanates according to the invention and (ii) polyisocyanates that have not been modified according to the invention.

The polyisocyanate mixtures according to the invention are valuable starting materials for the production of polyurethane plastics using the isocyanate polyaddition process. They are outstandingly suitable as crosslinking components for 2K PU coating compositions, in which the polyhydroxyl compounds present as reaction partners for the polyisocyanates are known preferably polyether polyols, polyester polyols and/or polyacrylate polyols. Lacquer binders or lacquer binder components having isocyanate-reactive groups other than hydroxyl groups are also suitable as reaction partners for the polyisocyanate mixtures according to the invention.

These reaction partners include polyurethanes or polyurethanes which are crosslinkable by virtue of the active hydrogen atoms present in the urethane or urea groups. Other suitable reaction partners include secondary amines of the type described, for example, in EP-A 403,921 or polyamines having blocked amino groups, such as polyketimines, polyaldimines or oxazolones. In the presence of moisture either unblocked amino groups are formed or, in the case of oxazolones, hydroxyl groups are formed, which subsequently react with the polyisocyanate mixtures according to the invention. Minor amounts of non functional lacquer binders may also be added to the polyisocyanate mixtures according to the invention in order to achieve highly specific properties, for example, as additives to improve adhesion.

The polyisocyanate and/or binder components in two component coating compositions lacquers based on the polyisocyanate mixtures according to the invention are generally used in a form diluted with solvents. Suitable solvents include the solvents described above for the performance of the products according to the invention or any desired mixtures of such solvents. Preferably, however, in 2K PU coating compositions containing the polyisocyanate mixtures according to the invention, the reaction partners are used in the form of dilute solutions in non-polar solvents, more preferably in non-polar solvents presenting only a slight environmental hazard, such as Swasol 310 (Maruzen Petrochemical Co. Ltd.; aniline point 43.5° C.), Exxon Naphtha No. 6 (Exxon Chemical Japan; aniline point 43° C.), Exxon Naphtha No. 5 (Exxon Chemical Japan, aniline point 55° C.) and others as described, e.g., in EP-A 566,037 (page 5, lines 40–46) and U.S. Pat. No. 5,086,175 (page 4, lines 43–55), and any desired mixtures of such solvents.

The polyisocyanate mixtures may also be used in a form blocked with the known blocking agents from polyurethane chemistry in combination with the lacquer binders or lacquer binder components as one-component PU stoving systems. Suitable blocking agents include malonic acid diethyl ester, acetoacetic ester, acetone oxime, butanone oxime, ε-caprolactam, 3,5-dimethylpyrazole, 1,2,4-triazole, dimethyl-1,2,4-triazole, imidazole and mixtures thereof.

When the polyisocyanate mixtures according to the invention are used as the crosslinking component for lacquer binders, they are generally used in quantities corresponding to an equivalent ratio of (optionally blocked) NCO groups to isocyanate-reactive groups, in particular alcoholic hydroxyl groups, of 0.5:1 to 2.0:1, preferably of 0.8:1 to 1.2:1 and more preferably of 0.9:1 to 1.1:1.

Any desired substrates may be coated with coating compositions formulated using the polyisocyanate mixtures according to the invention. Examples include metal, wood, glass, stone, ceramic materials, concrete, rigid and flexible plastics, textiles, leather and paper. These substrates may optionally be provided with known primers before coating.

The coating compositions may also contain known additives such as catalysts, leveling agents, coloring pigments, extenders or flatting agents. The resulting coatings generally exhibit good technical properties even when dried at room temperature. They may also be dried under forced conditions at elevated temperature or by stoving at temperatures of up to 260° C.

The polyisocyanate mixtures according to the invention permit the formulation of high-grade, light-fast coating compositions which, in comparison with previously known solvent-based 2K PU systems, exhibit low or zero emissions of environmentally questionable solvents and, in comparison with coating compositions dissolved in conventional solvents, exhibit distinctly improved overcoating characteristics. The higher functionality of the polyisocyanate mixtures according to the invention in comparison with, for example, allophanate trimers, results in improved lacquer properties, such as resistance to solvents and chemicals.

The invention is further illustrated but is not intended to be limited by the following examples.

EXAMPLES

The phrase "degree of allophanatization" means the percentage of urethane groups, which may be calculated from the NCO content, that have been converted from monoalcohol and polyisocyanate into allophanate groups. All other parts and percentages are by weight, unless otherwise specified.

Starting Polyisocyanates

Polyisocyanate A1)

A polyisocyanate containing iminooxadiazinedione groups, prepared from 1,6-diisocyanatohexane (HDI) according to EP-A 798 299 (U.S. Pat. No. 5,914,383), and having an NCO content of 23.2%, an average functionality of 3.3 (according to GPC) and a monomeric HDI content of 0.4%.

Polyisocyanate A2)

A 70% solution of a polyisocyanate containing isocyanurate groups, prepared from (IPDI) according to EP-A 003 765 (U.S. Pat. No. 4,288,586) in Solvent Naphtha solvent, and having an NCO content of 11.8%, an average functionality of 3.3 (according to GPC) and a monomeric IPDI content of 0.2%.

Polyisocyanate A3)

A polyisocyanate containing isocyanurate groups, preferred from HDI according to DE-A 3,806,276, and having an NCO content of 23.6%, an average functionality of 3.2 (according to GPC) and a monomeric HDI content of 0.3%.

Comparison Polyisocyanate

Comparison polyisocyanate V1)

A polyisocyanate containing allophanate and isocyanurate groups, prepared from HDI according to EP-A 496,208 (U.S. Pat. No. 5,124,427), and having an NCO content of 20%, an average functionality of 2.4 (according to GPC) and a monomeric HDI content of 0.1%.

Example 1

540 g of polyisocyanate A1) and 360 g of polyisocyanate A2) were combined with stirring under dry nitrogen with 81.6 g of a technical grade fatty alcohol (Lorol, available from Henkel AG and having the following properties: acid value max. 0.1; saponification value max. 1,2, hydroxyl value 265–279; water content max. 0.2%; chain distribution: <C12: 0–3%; C12: 48–58%; C14: 18–24%; C16: 8–12%; C18: 11–15%; >C18: 0–1%) and heated to 80° C. until a titrimetrically determined NCO content of 15.4% was reached. 0.2 g of zinc(II) 2-ethyl-1-hexanoate to initiate the allophanatization reaction. The temperature was raised to 110° C. and the mixture was stirred at this temperature until an NCO content of 13.7% was reached, which corresponded to complete allophanatization. The reaction was terminated by adding 0.01 g of benzoyl chloride and simultaneously cooling the mixture. A virtually colorless, clear polyisocyanate was obtained having the following properties:

NCO content: 13.7%

NCO functionality (according to formula [2]): 3.93

Degree of allophanatization: x=1

Content of alkoxy groups according to formula [1]: 8.3%

Example 2

582.9 g of polyisocyanate A1) and 582.9 g of polyisocyanate A2) were combined with stirring under dry nitrogen with 81.6 g of the technical grade fatty alcohol described in Example 1 and 4.5 g of 1,12-octadecane diol and heated to 80° C. until a titrimetrically determined NCO content of 15.4% was reached. 0.25 g of zinc(II) 2-ethyl-1-hexanoate were then added to initiate the allophanatization reaction. The temperature was raised to 110° C. and the mixture was stirred at this temperature until an NCO content of 14.4% was reached, which corresponded to complete allophanatization. The reaction was terminated by adding 0.01 g of benzoyl chloride and simultaneously cooling the mixture. A virtually colorless, clear polyisocyanate was obtained having the following properties:

NCO content: 14.4%

NCO functionality (according to formula [2]): 3.68

Degree of allophanatization: x=0.94

Content of alkoxy groups according to formula [1]: 5.4%

Example 3

270 g of polyisocyanate A1) and 180 g of polyisocyanate A2) were combined with stirring under dry nitrogen with 40.8 g of the technical grade fatty alcohol described in Example 1 and heated to 80° C. until a titrimetrically determined NCO content of 15.4% was reached. 0.1 g of bismuth(III) 2-ethyl-1-hexanoate were then added to initiate the allophanatization reaction. The temperature was raised to 110° C. and the mixture was stirred at this temperature until a titrimetrically determined NCO content of 13.8% was reached. The reaction was terminated by adding 0.01 g of benzoyl chloride and simultaneously cooling the mixture. A virtually colorless, clear polyisocyanate was obtained having the following properties:

NCO content: 13.8%

NCO functionality (according to formula [2]): 3.89

Degree of allophanatization: x=0.97

Content of alkoxy groups according to formula [1]: 8.3%

Example 4

666 g of polyisocyanate A2) were initially introduced at 90° C. with stirring under dry nitrogen and 62 g of the technical grade fatty alcohol described in Example 1 were added dropwise until a titrimetrically determined NCO content of 9.1% was reached. 444 g of polyisocyanate A3) and 0.24 g of zinc(II) 2-ethyl-1-hexanoate were then added to initiate the allophanatization reaction. The temperature was raised to 110° C. and the mixture was stirred at this temperature until an NCO content of 13.5% was reacted, which corresponded to complete allophanatization. The reaction was terminated by adding 0.01 g of benzoyl chloride and simultaneously cooling the mixture. A virtually colorless, clear polyisocyanate was obtained having the following properties:

NCO content: 13.5%

NCO functionality (according to formula [2]): 3.60

Degree of allophanatization: x=1

Content of alkoxy groups according to formula [1]: 5.3%

Example 5

666 g of polyisocyanate A2) and 444 g of polyisocyanate A3) were initially introduced at 80° C. with stirring under dry nitrogen and 62 g of the technical grade fatty alcohol described in Example 1 were added dropwise until a titrimetrically determined NCO content of 14.6% was reached. 0.24 g of zinc(II) 2-ethyl-1-hexanoate were then added to initiate the allophanatization reaction. The temperature was raised to 110° C. and the mixture was stirred at this temperature until a titrimetrically determined NCO content of 13.5% was reached. The reaction was terminated by adding 0.01 g of benzoyl chloride and simultaneously cooling the mixture. A virtually colorless, clear polyisocyanate was obtained having the following properties:

NCO content: 13.5%

NCO functionality (according to formula [2]): 3.59

Degree of allophanatization: x=0.99

Content of alkoxy groups according to formula [1]: 5.3%

Example 6

666 g of polyisocyanate A2) and 444 g of polyisocyanate A3) were initially introduced at 80° C. with stirring under dry nitrogen and 62 g of the technical grade fatty alcohol described in Example 1 were added dropwise until a titrimetrically determined NCO content of 14.6% was reached. 0.29 g of zinc(II) 2-ethyl-1-hexanoate were then added to initiate the allophanatization reaction. The temperature was raised to 110° C. and the mixture was stirred at this temperature until a titrimetrically determined NCO content of 13.6% was reached. The reaction was terminated by cooling. A virtually colorless, clear polyisocyanate was obtained having the following properties:

NCO content: 13.6%

NCO functionality (according to formula [2]): 3.55

Degree of allophanatization: x=0.93

Content of alkoxy groups according to formula [1]: 5.3%

Example 7 (Dissolution stability)

A 30% solution of each of the polyisocyanate mixtures from Examples 1–6 was prepared in a non-polar solvent (Swasol 310, available from Maruzen Petrochemical Co. Ltd., aniline point: 43.5° C.). The amount of solvent present in polyisocyanate A2) was taken into account when preparing the solution. The solution stability of the solution at 0° C. was then observed over 14 days. Solutions of unmodified starting polyisocyanates A1), A2) and A3) were used as comparisons.

TABLE 1

Testing of storage stability of the prepared solutions

|  |  | After storage for 14 days at 0° C. |
|---|---|---|
| Polyisocyanate from Ex. 1 |  | clear solution |
| Polyisocyanate from Ex. 2 |  | clear solution |
| Polyisocyanate from Ex. 3 |  | clear solution |
| Polyisocyanate from Ex. 4 |  | clear solution |
| Polyisocyanate from Ex. 5 |  | clear solution |
| Polyisocyanate from Ex. 6 |  | clear solution |
| Starting polyisocyanate A1) | comparison | two phases |
| Starting polyisocyanate A2) | comparison | two phases |
| Starting polyisocyanate A3) | comparison | two phases |
| Comparison polyisocyanate V1) | comparison | clear solution |

The comparison shows that the allophanate-modified polyisocyanate mixtures according to the invention and the allophanate trimer V1) dissolve distinctly better in non-polar solvents than do unmodified starting polyisocyanates A1), A2) and A3).

Example 8 Use

Clear coatings were formulated from a stock lacquer containing 63 parts by weight of a polyacrylate polyol (produced by polymerizing 44.62% styrene, 27.89% butyl acrylate, 22.57% hydroxypropyl methacrylate, 1.82% methyl methacrylate and 0.60% acrylic acid in the presence of 2.50% of di-tert.-butyl peroxide as initiator and having an OH number of 53 mg of KOH/g of solids), 0.6 parts by weight of a leveling agent (Baysilone lacquer additive OL 17, available from Bayer, 10% in xylene), 1.1 parts by weight of an accelerator (zinc 2-ethylhexanoate, 10% in xylene) and 35.3 parts by weight of a non-polar solvent (Swasol 310, Maruzen Petrochemical Co. Ltd.; aniline point 43.5° C.), and a 75% solution in the preceding non-polar solvent of each of the polyisocyanate mixtures from Examples 1 to 6. The polyisocyanate component and the stock lacquer were in each case used at an NCO/OH equivalent ratio of 1:1.

The clear coating compositions were knife-coated onto a glass sheet using an application frame. After briefly flashing off, the films were dried at 120° C. for 30 minutes in a drying cabinet and then stored for 16 h at 60° C.

The resistance of the resulting coatings was investigated with various solvents. A cotton wool swab soaked in solvent was applied onto the cured coating and the area was covered with a watch glass. After a predetermined period (exposure time), the watch glass and cotton wool swab were removed and any remaining solvent residues were carefully removed by blotting with a paper tissue. The area of the coating was inspected visually.

| Solvent | Exposure time |
|---|---|
| Xylene/MPA/ethyl acetate/acetone | 1 min |
| Swasol 310 solvent/Exxon 6 solvent/Exxon 5 solvent | 5 min and, to improve differentiation, also 30 min |

Film hardness was determined according to the König pendulum damping value (DIN 53 157).

For comparison purposes coatings were also prepared in the same manner from comparison polyisocyanate V1). Attempts to produce coatings in a similar manner from starting isocyanates A1), A2) or A3) were not successful because the starting isocyanates do not dissolve in the above-mentioned solvents.

TABLE 2

Coating properties

|  | Polyisocyanate from Example: | | | | | | Comparison: |
|---|---|---|---|---|---|---|---|
|  | 1 | 2 | 3 | 4 | 5 | 6 | V1) |
| Optical properties of film | clear | clear | clear | clear | clear | clear | clear |
| Resistance to: |  |  |  |  |  |  |  |
| xylene | 0 | 0 | 0 | 0 | 0 | 0 | 4 |
| methoxypropyl acetate | 0 | 0 | 0 | 0 | 0 | 0 | 1 |
| ethyl acetate | 0 | 0 | 0 | 0 | 0 | 1 | 4 |
| acetone | 0 | 0 | 1 | 0 | 1 | 1 | 4 |
| Swasol 310* solvent | 0 | 0 | 0 | 0 | 0 | 0 | 1 |
| Exxon Naphtha No. 5** solvent | 0 | 0 | 0 | 0 | 0 | 0 | 0 |
| Exxon Naphtha No. 6*** solvent | 0 | 0 | 0 | 0 | 0 | 0 | 0 |
| König pendulum damping [DIN 53 157] | 201 | 198 | 195 | 200 | 197 | 198 | 194 |

*Maruzen Petrochemicals Co. Ltd.
**Exxon Chemical Japan
***Exxon Chemical Japan
Key to rating:
0 film was unchanged after treatment
1 film was permanently marked (ring)
2 film can be marked by scratching
3 film can be scratched off
4 film completely destroyed The comparison demonstrates that the film prepared from the coating composition containing prior art allophanate trimer V1) exhibits only moderate resistance characteristics; whereas, films prepared from coating compositions containing the polyisocyanates according to the invention exhibit good resistance to solvents.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyisocyanate mixture prepared from an aliphatic and/or cycloaliphatic diisocyanate and having
    a) an average isocyanate functionality of at least 2.0,
    b) a content of isocyanate groups (calculated as NCO; molecular weight=42) of 4.0 to 28.0 wt. % and
    c) a content of alkoxy groups having up to 36 carbon atoms of 2.0 to 37.5 wt. %,
wherein the alkoxy groups are constituents of allophanate groups or urethane groups, provided that >50 mol % of the alkoxy groups are a constituent of allophanate groups that are connected to at least two polyisocyanate molecules which are each prepared from at least two diisocyanates.

2. The polyisocyanate mixture of claim 1 having
    a) an average isocyanate functionality of 2.3 to 9.9,
    b) a content of isocyanate groups (calculated as NCO; molecular weight=42) of 5.0 to 24.0 wt. % and
    c) a content of alkoxy groups having up to 36 carbon atoms of 3.0 to 29.0 wt. %.

3. The polyisocyanate mixture of claim 1 wherein said polyisocyanate molecules contain isocyanurate and/or iminooxadiazinedione groups.

4. The polyisocyanate mixture of claim 2 wherein said polyisocyanate molecules contain isocyanurate and/or iminooxadiazinedione groups.

5. The polyisocyanate mixture of claim 1 wherein at least 80 mol % of the alkoxy groups are a constituent of allophanate groups that are connected to at least two polyisocyanate molecules which are each prepared from at least two diisocyanates.

6. The polyisocyanate mixture of claim 2 wherein at least 80 mol % of the alkoxy groups are a constituent of allophanate groups that are connected to at least two polyisocyanate molecules which are each prepared from at least two diisocyanates.

7. The polyisocyanate mixture of claim 3 wherein at least 80 mol % of the alkoxy groups are a constituent of allophanate groups that are connected to at least two polyisocyanate molecules which are each prepared from at least two diisocyanates.

8. The polyisocyanate mixture of claim 4 wherein at least 80 mol % of the alkoxy groups are a constituent of allophanate groups that are connected to at least two polyisocyanate molecules which are each prepared from at least two diisocyanates.

9. A coating composition comprising the polyisocyanate mixture of claim 1 as a crosslinking agent and a lacquer binder or lacquer binder component having isocyanate-reactive groups.

10. A two-component polyurethane coating composition comprising the polyisocyanate mixture of claim 1 as a crosslinking agent and a hydroxy-functional lacquer binder or lacquer binder component.

11. A process for preparing a polyisocyanate mixture having
  a) an average isocyanate functionality of at least 2.0,
  b) a content of isocyanate groups (calculated as NCO; molecular weight=42) of 4.0 to 28.0 wt. % and
  c) a content of alkoxy groups having up to 36 carbon atoms, which are constituents of allophanate or urethane groups, of 2.0 to 37.5 wt. %, which comprises reacting
    A) a polyisocyanate component prepared from at least two diisocyanate molecules and having an average NCO functionality of 2.0 to 5.0, a content of aliphatically and/or cycloaliphatically bound isocyanate groups (calculated as NCO; molecular weight=42) of 8.0 to 27.0 wt. % and a content of monomeric diisocyanates of less than 1 wt. % with
    B) a (cyclo)aliphatic alcohol having up to 36 carbon atoms, at an NCO/OH equivalent ratio of 1.9:1 to 80:1 such that >50% of the urethane groups formed by the NCO/OH reaction are converted to allophanate groups.

12. The process of claim 11 wherein polyisocyanate component A) has an average NCO functionality of 2.3 to 4.5, a content of aliphatically and/or cycloaliphatically bound isocyanate groups (calculated as NCO; molecular weight=42) of 14.0 to 24.0 wt. % and a content of monomeric diisocyanates of less than 0.5 wt. %.

13. The process of claim 11 wherein polyisocyanate component A) comprises a polyisocyanate prepared from 1,6-diisocyanatohexane and/or 1-isocyanato-3,3,5-trimethyl-5-isocyanatomethylcyclohexane and containing isocyanurate and/or iminooxadiazinedione groups.

14. The process of claim 12 wherein polyisocyanate component A) comprises a polyisocyanate prepared from 1,6-diisocyanatohexane and/or 1-isocyanato-3,3,5-trimethyl-5-isocyanatomethylcyclohexane and containing isocyanurate and/or iminooxadiazinedione groups.

15. The process of claim 11 wherein the (cyclo)aliphatic alcohol comprises a member selected from the group consisting of n-octanol, n-nonanol, 2-ethylhexanol, trimethylhexanol, n-decanol, n-undecanol, n-dodecanol (lauryl alcohol), n-tetradecanol, n-pentadecanol, n-hexadecanol, n-heptadecanol, n-octadecanol (stearyl alcohol) and 2,6,8-trimethylnonanol.

16. The process of claim 12 wherein the (cyclo)aliphatic alcohol comprises a member selected from the group consisting of n-octanol, n-nonanol, 2-ethylhexanol, trimethylhexanol, n-decanol, n-undecanol, n-dodecanol (lauryl alcohol), n-tetradecanol, n-pentadecanol, n-hexadecanol, n-heptadecanol, n-octadecanol (stearyl alcohol) and 2,6,8-trimethylnonanol.

17. The process of claim 13 wherein the (cyclo)aliphatic alcohol comprises a member selected from the group consisting of n-octanol, n-nonanol, 2-ethylhexanol, trimethylhexanol, n-decanol, n-undecanol, n-dodecanol (lauryl alcohol), n-tetradecanol, n-pentadecanol, n-hexadecanol, n-heptadecanol, n-octadecanol (stearyl alcohol) and 2,6,8-trimethylnonanol.

18. The process of claim 14 wherein the (cyclo)aliphatic alcohol comprises a member selected from the group consisting of n-octanol, n-nonanol, 2-ethylhexanol, trimethylhexanol, n-decanol, n-undecanol, n-dodecanol (lauryl alcohol), n-tetradecanol, n-pentadecanol, n-hexadecanol, n-heptadecanol, n-octadecanol (stearyl alcohol) and 2,6,8-trimethylnonanol.

19. The process of claim 11 which comprises carrying out the reaction in the presence of an allophanatization catalyst comprising an organic zinc(II) or bismuth(III) compound.

20. The process of claim 11 wherein component B) comprises a mixture of mono- and difunctional alcohols.

* * * * *